United States Patent [19]
Torok et al.

[11] Patent Number: 5,547,167
[45] Date of Patent: Aug. 20, 1996

[54] GATE VALVE FOR FLUIDIZED PARTICULAR MATERIAL

[75] Inventors: Robert J. Torok, Kirtland; Ernest A. Duschen, Geauga, both of Ohio

[73] Assignee: General Signal Corporation, Stamford, Conn.

[21] Appl. No.: 493,040

[22] Filed: Jun. 21, 1995

[51] Int. Cl.$^6$ .................................................. F16K 3/18
[52] U.S. Cl. ................................................ 251/187; 251/203
[58] Field of Search ................................. 251/187, 193, 251/203

[56] References Cited

U.S. PATENT DOCUMENTS

| | | | |
|---|---|---|---|
| 3,768,773 | 10/1973 | Stephens | 251/203 X |
| 4,491,145 | 1/1985 | Williams et al. | 251/203 X |
| 5,003,943 | 4/1991 | Lafferty, Sr. | 251/203 X |

*Primary Examiner*—John C. Fox
*Attorney, Agent, or Firm*—Milton E. Kleinman; Raymond E. Smiley; Robert S. Smith

[57] ABSTRACT

A gate valve apparatus which includes a housing having a passageway defined therein for a fluent material, a generally planar gate, and apparatus for supporting the gate within the housing. The apparatus for supporting allows movement of the gate in opposed first and second directions that are generally parallel to the generally planar gate. The apparatus also includes an annular seal carried on the housing around the perimeter of the passageway and apparatus for moving the gate in a direction substantially perpendicular to the generally planar gate. The apparatus for moving includes a first and second shafts, the shafts have a first and second axial portions that is disposed in eccentric relationship to other axial portions of the shaft, a roller is carried on each of these eccentric portions. A roller including a bearing allowing free rotational movement is carried on each of these eccentric axial portions. The apparatus may include structure for rotating the first and second shafts to urge the rollers against the gate and move the gate to compress the seal. This apparatus may include at least a first pneumatic cylinder and a mechanical over-center linkage coupling the first pneumatic cylinder and the first and second shafts. The linkage may have a locking position which the linkage will maintain after once been attained followed by a failure of the pneumatic supply to the first pneumatic cylinder. The linkage may include an S-shaped arm fixed to the first shaft and a second arm fixed to the second shaft. Each of the various embodiments of the invention may use bearings that are needle bearings.

20 Claims, 3 Drawing Sheets

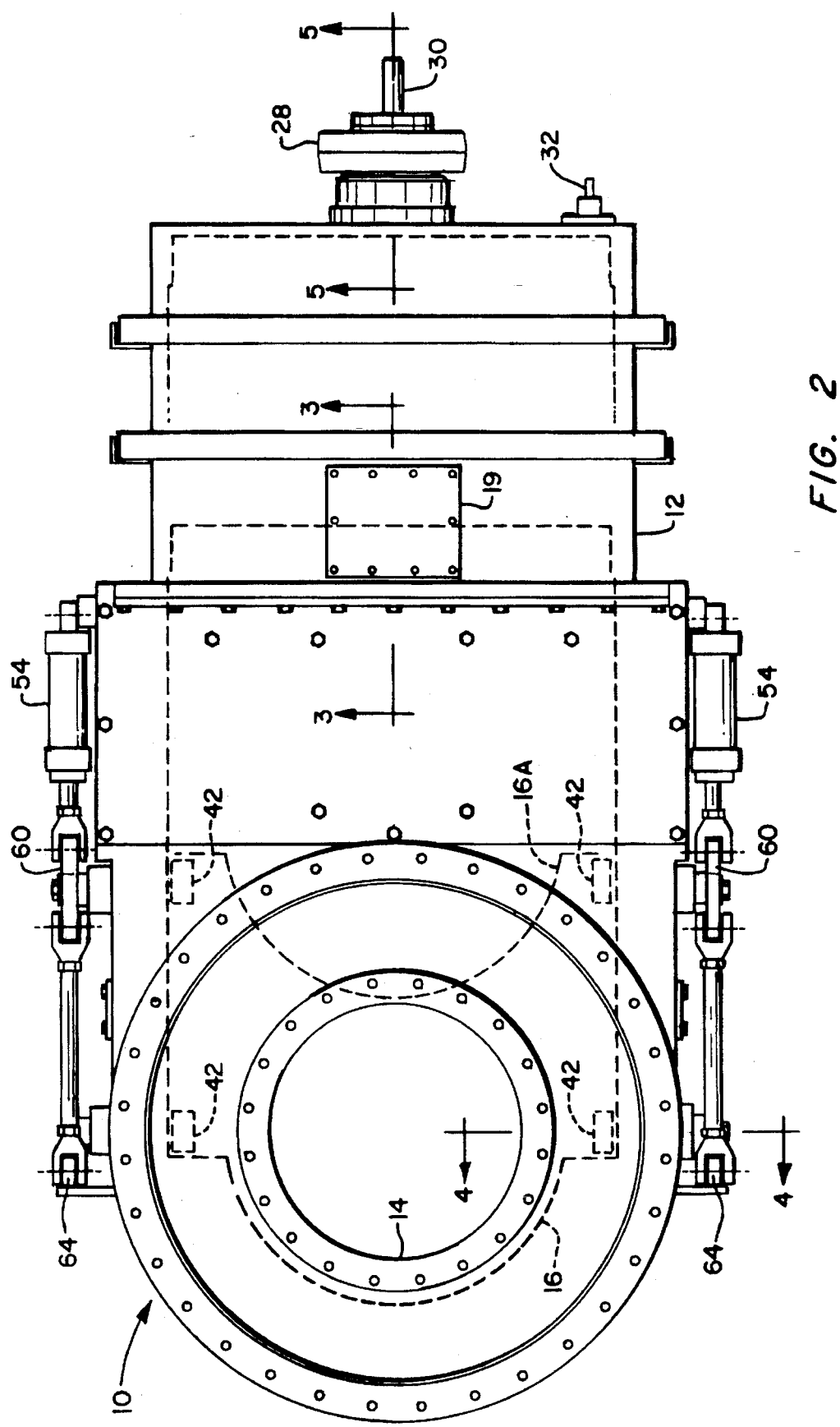

GATE VALVE FOR FLUIDIZED PARTICULAR MATERIAL

BACKGROUND OF THE INVENTION

The invention relates to gate valves and particularly to very large gate valves and the sealing of such valves. While the present invention has particular application to fly ash control systems those skilled in the art will recognize other applications. In a typical application for the present invention the opening through which the fluidized particulate material, the fly ash, is approximately 19 inches in diameter. The overall length in this typical application of the entire valve mechanism is over 100 inches. In a typical application it necessary that the valve tightly seal off flow at up to 15 psig so that maintenance work may be performed down-stream of the valve. Any leakage would be hazardous to personnel working down-stream of the valve.

The prior art includes Steckle U.S. Pat. No. 3,495,805 which shows a gate valve with an eccentric surface that cooperates with a pad on the side of the gate to urge the gate into engagement with a stationery seal. It is inherent in this design that the friction between the eccentric surface and the pad will cause wear of the eccentric surface and the pad.

Whaley U.S. Pat. No. 1,391,9871 discloses another gate valve having dual gates. An eccentric member is disposed between the first and second gates is rotatable to an angular position of greatest eccentricity to force both the gates against stationery seals.

This structure also does not prevent the transfer of lateral forces to the respective gates and thus causes lateral movement of the gates with respect to the seats that cooperate with the gates. The lateral movement of the gate or gates in these structures causes seal wear because of the relative movement between the gate or gates and the seal or seals associated therewith.

Neale U.S. Pat. No. 4,535,801 discloses a gate valve having a pressurized bonnet. The valve shown in this Patent is intended for handling powdered materials, such as powdered coal fed to a steam boiler or coal and lime to a gasifier. Usnick et al. U.S. Pat. No. 4,174,728 also discloses a pressurized bonnet.

Some prior art gate valves have relied on metal to metal seals. While this does eliminate wear problems associated with elastomeric seals, it is not satisfactory for many applications because the metal to metal seal will allow too much leakage particularly at pressures of 14 or 15 psig.

It is an object of the invention to provide a gate valve that will have virtually no seal wear.

Another object of the invention is to provide a gate valve structure that will seal in a manner that results in no lateral movement of the gate.

Still another object of the invention is to provide a mechanism for latching the gate against the seal that will maintain the sealing relationship even if fluid pressure that operates the latching mechanism fails.

Yet another object of the invention is to provide apparatus that will seal in a manner that will minimize leakage and hazards to personnel working down stream from the valve.

Another object of the invention is to provide a structure in which the seal is disposed at a location which is not in the path of direct material flow when the valve is open.

SUMMARY OF THE INVENTION

It has now been found that these and other objects of the invention may be attained in a gate valve apparatus which includes a housing having a passageway defined therein for a fluent material, a generally planar gate, and means for supporting the gate within the housing. The means for supporting allows movement of the gate between a position that covers the passageway and position that does not block the passageway. The movement is in opposed first and second directions that are generally parallel to the generally planar gate. The apparatus also includes an annular seal carried on the housing around the perimeter of the passageway; and means for moving the gate in a direction substantially perpendicular to the generally planar gate. The means for moving includes a first shaft, having a first axial portion that is disposed in eccentric relationship to other axial portions of the first shaft and a first roller carried on the first axial portion of the first shaft, the first roller includes a bearing allowing free rotational movement about the first axial portion of the first shaft.

In some forms of the invention the means for moving includes a second shaft, the second shaft has a first axial portion that is disposed in eccentric relationship to other axial portions of the third shaft, a second roller is carried on the first axial portion of the second shaft, the second roller includes a bearing allowing free rotational movement about the first axial portion of the third shaft.

The means for moving may include a third shaft having a first axial portion that is disposed on eccentric relationship to other axial portions of the third shaft and a third roller carried on the first axial portion of the third shaft, the third roller includes a bearing allowing free rotational movement about the first axial portion of the third shaft.

The means for moving may include a fourth shaft having a first axial portion that is disposed in eccentric relationship to other axial portions of the fourth shaft, a fourth roller carried on the first axial portion of the fourth shaft, the fourth roller includes a bearing allowing free rotational movement about the first axial portion of the fourth shaft.

In other forms of the invention the apparatus includes means for rotating the first, second, third and fourth shafts to urge the rollers carried on the respective first axial portions against the gate and move the gate to compress the seal. This means may include at least a first pneumatic cylinder and a mechanical over-center linkage coupling the first pneumatic cylinder and the first and second shafts. The linkage may have a locking position which the linkage will maintain after once been attained followed by a failure of the pneumatic supply to the first pneumatic cylinder. The linkage may include an S-shaped arm fixed to the first shaft and a second arm fixed to the second shaft.

The means for supporting may include an intermediate roller disposed to engage the gate when the first, second, third and fourth rollers to are not engaged with the gate. Each of the various embodiments of the invention may use bearings that are needle bearings.

BRIEF DESCRIPTION OF THE DRAWING

The invention will be better understood by reference to the accompanying drawing in which:

FIG. 2 is a plan view of the valve shown in FIG. 1.

DESCRIPTION OF THE PREFERRED EMBODIMENT OF THE INVENTION

Figure 1:
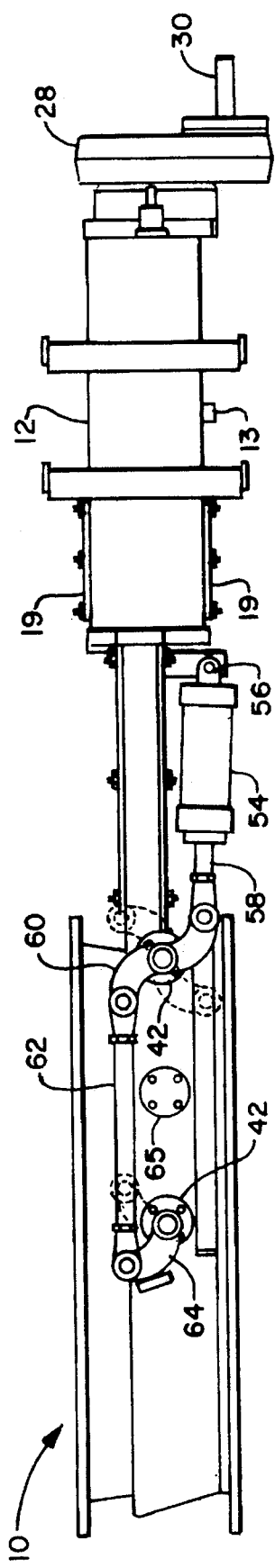
FIG. 1 is a front view of one embodiment of the gate valve in accordance with the present invention.

Referring now to FIGS. 1 and 2 there is shown a valve in accordance with a preferred form of the invention. The valve includes a body 10 to which is attached a bonnet 12. The bonnet 12 eliminates the need for packing around the gate 16 and the maintenance required for such packing. A port 13 in the bonnet 12 is connected to a seal air system (not shown) to provide positive pressure within the bonnet 12 and thus prevent passage of particulate material into the bonnet 12.

The body 10 has a 19 inch diameter opening 14 for passage of the particulate material in the illustrated embodiment. (Other preferred forms of the invention have openings of other sizes.) The opening 14 is closed by a generally planar gate 16. As best seen in FIG. 2 the gate 16 is movable to a closed position in which the gate 16 completely overlaps the opening 14. Alternatively, the gate 16 is movable to an open position indicated by reference numeral 16A. In the latter position the gate 16 is withdrawn partially from the housing 10 into the bonnet 12.

Figure 3:
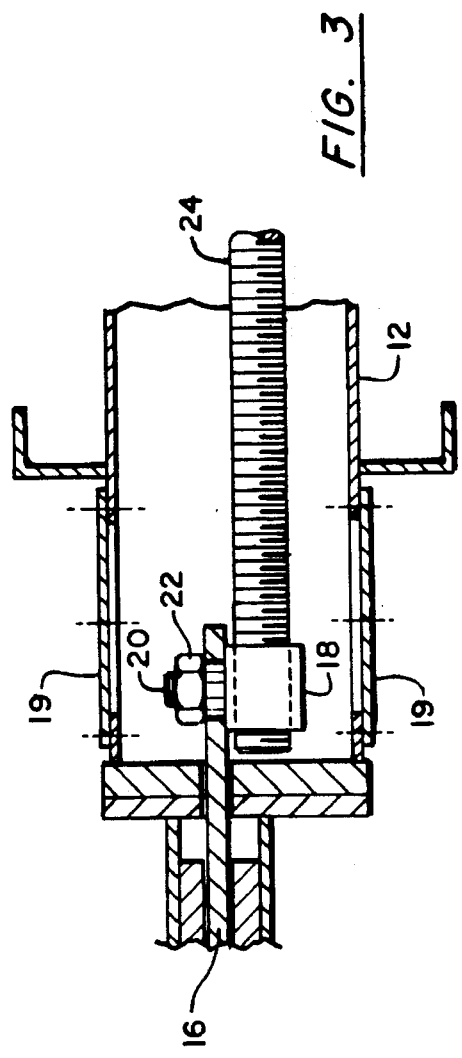
FIG. 3 is a fragmentary sectional view taken alone the line 3—3 of FIG. 2 illustrating the mechanism for moving the gate between the open and closed positions in greater detail.

The mechanism for moving the gate 16 is shown in greater detail in FIG. 3. An internally threaded sleeve 18 is secured by a stud 20 and nut 22 to the gate 16. An externally threaded shaft 24 cooperates with the sleeve 18. Rotation of the shaft 24 causes axial movement of the sleeve 18 along the axial extent of the shaft 24 and thereby the movement of the gate 16. Top and bottom access covers 19, 19 allow access through the bonnet 12.

Figure 5:
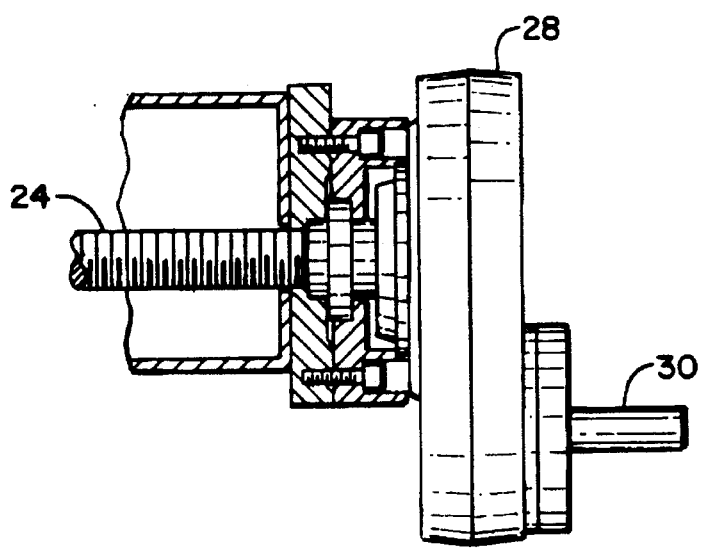
FIG. 5 is a fragmentary sectional view taken alone the line 5—5 of FIG. 2 and illustrating the speed reducing mechanism that provides a mechanical advantage for manual operation of the gate positioning mechanism shown in FIG. 3.

The shaft 24 is connected to a 6:1 speed reducer 28 as best seen in FIG. 5. An input shaft 30 is coupled to a hand wheel (not shown) for manual operation of the valve. The speed reducer 28 caused a mechanical advantage for movement of the heavy gate 16.

A mechanical position indicator 32, visible in FIG. 2, is an elongated rod that has an axial travel of approximately 1.5 inches. Movement of the gate causes surfaces on the gate to contact the rod and move the rod to indicate the gate position. The tip of the indicator 32 will ordinarily be painted a conspicuous color to provide a visual indication of the gate 16 position.

Figure 4:
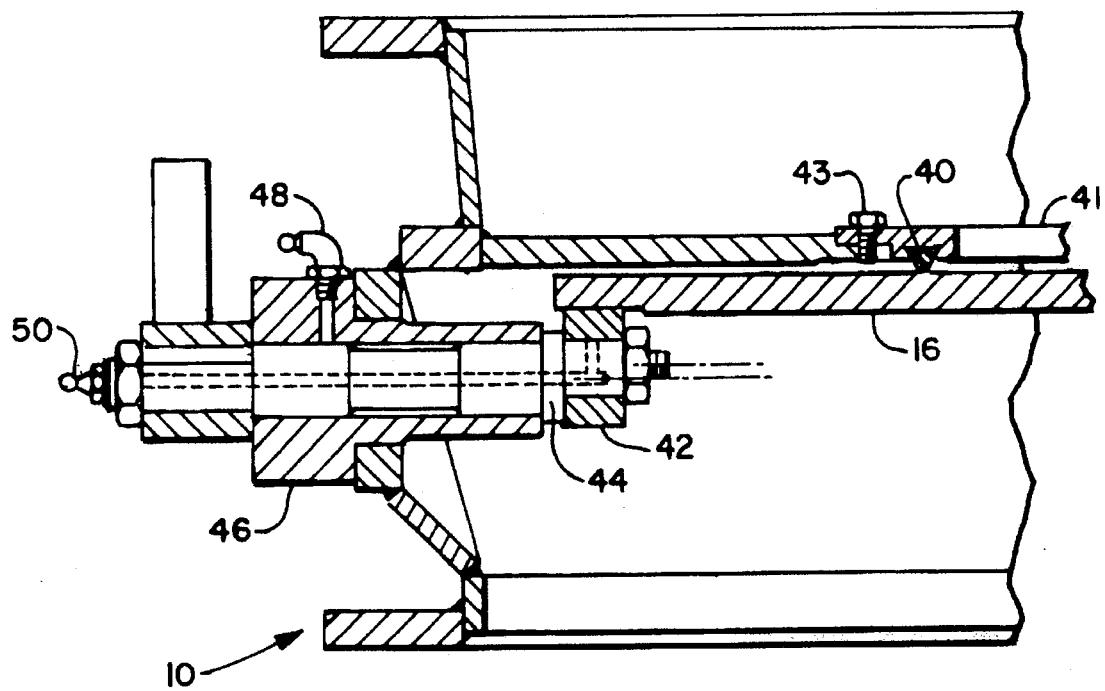
FIG. 4 is a fragmentary sectional view taken alone the line 4—4 of FIG. 2 and illustrating the mechanism for moving the gate into sealing engagement with the elastomeric seal.

The mechanism for sealing the gate 16 is independent of the mechanism for moving the gate 16 from the open to the closed position. As best seen in FIG. 4 the perimeter of the opening 14 is provided with a triangular cross-section seal 40. The seal 40 has one vertex disposed in interfering relationship with the face of the gate 16 when the gate 16 is moved upwardly into the sealed position. The triangular seal 40 is advantageous because it provides a high contact pressure with a relatively low compression force requirement. The seal 40 is secured by an annular retainer 41 to the housing 10. More specifically, bolts 43 secure the retainer 41 to the housing 10. (For drawing clarity the location of the seal 40 and retainer 41 has been rotated 9 degrees inches from the actual location.)

During normal operation, after the gate 16 is moved to the closed position, the position best seen in to FIG. 2 in which the gate overlaps the opening 14, the gate 16 is raised vertically to engage and compress the seal 40. The gate 16 is raised by means of four vertical motion rollers 42. Each of the rollers 42 is mounted on an eccentric axial part of a shaft 44 carried in a bronze journal bearing 46 that is fixed to the housing 10. It will be understood that the shaft 44 is shaped somewhat like an automobile engine crankshaft. In other words, axial portions are concentric with a common centerline, and other axial portions are eccentric with respect to the common centerline. In the preferred embodiment the eccentric portions on which each roller 42 is mounted is eccentric about 3/16 of an inch. Each of the rollers 42 is two inches in diameter. Rotation of the shaft 44 through a 90 degree angle results in 3/16 inch of vertical motion which is sufficient for adequate seal compression.

The journal bearing 46 is provided with a first grease fitting 48 and a second grease fitting 50. The fittings 48, 50 enable good lubrication of the shaft 44 and roller 42 to minimize friction and the force required to rotate the shaft 44. The journal bearing 46 structure is replaceable from the exterior of the valve. This is of importance because maintenance of the valve may more easily be performed.

In the preferred embodiment each roller 42 includes a needle bearing that allows free rotational movement of that roller 42 about the eccentric axial portion of the shaft 44 on which the roller 42 is mounted for rotation. Other bearing forms may be utilized in other embodiments. The needle bearing is particularly desirable because the small size permits the use of a larger diameter shaft 44 and thus ensure adequate structural rigidity.

Rotation of the eccentric shaft 44 is achieved with two pneumatic cylinders 54, 54 which are coupled to the shaft 44 by an over-center mechanical leakage. It will be understood that the linkage is adjustable. The preferred embodiment has the linkage adjusted so that the linkage has an over center locking position. As best seen in FIGS. 1 and 2, each pneumatic cylinder 54 is carried on the bonnet 12 by yoke and pin arrangement 56. The piston shaft 58 is connected to an axial extremity of an S-shaped arm 60 that is fixed to an eccentric shaft 44. The S-shaped arm 60 is pivotally joined at the other axial extremity to a rod 62 that is fixed to the free end of an arm 64 that is fixed to a second eccentric shaft 44. The arm 64 is disposed at an angle of 45 degrees to a perpendicular to the gate 16 in the sealed position of the gate 16. This linkage is adjusted so that pressure within the cylinders 54 causes rotation of each of the four eccentric shafts 44, 44.

As best seen in FIG. 2 there are four rollers 42 that contact the gate 16. Two of the rollers 42 are carried on eccentric axial portions of first and second shafts 44, 44 that are fixed respectively to first and second arms 64, 64. Two other rollers 42, 42 are carried on eccentric axial portions of third and fourth shafts 44. The third and fourth shafts are respectively fixed to first and second S-shaped arms 60, 60. Accordingly, the rotation of the four shafts 44, 44 causes the four rollers 42, 42, 42, 42 to push against the gate 16 and thus to raise the gate 16 and seat the gate 16 against the seal 40.

When the pneumatic pressure is applied to the cylinders 54, 54 the linkage coupling the cylinders 54, 54 to the four shafts 44, 44 44, 44 will move to an over-center position. This position is a locking position that will be maintained even if pneumatic pressure is inadvertently lost within the cylinders 54. Thus, unintentional loss of pneumatic pressure in the cylinders does not endanger personnel working downstream of the valve. Preferably the cylinder 54 is a double acting cylinder and piston assembly to which pneumatic pressure may be applied in a manner that will move the linkage out of the over-center position to the position shown in phantom in FIG. 1.

Two intermediate coaxial roll assemblies 65 (one shown in FIG. 1) are carried on shafts (not shown) fixed to the housing 10. The roll assemblies 65 are provided to support the gate 16 when the gate is not engaged by the rollers 42. Thus, when the rollers 42 are not forcing the gate 16 against the seal 40 the gate 16 will move downwardly to rest on the roll assemblies 65 as well as the four rollers 42, 42, 42, 42 which are rotated to the down position. In other words the gate 16 is supported by six rollers in down position. The six rollers are the four rollers 42 and the two roll assemblies 65. In this position the gate 16 is supported for horizontal movement caused by the shaft 24.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described our invention we claim:

1. A gate valve apparatus which comprises:

a housing having a passageway defined therein for a fluent material;

a generally planar gate;

means for supporting the gate within said housing, said means for supporting allowing movement of said gate in opposed first and second directions, said first and second directions being generally parallel to said generally planar gate;

an annular seal carried on said housing around the perimeter of said passageway; and means for moving said gate in a direction substantially perpendicular to said generally planar gate, said means for moving including a first shaft, said first shaft having a first axial portion that is disposed in eccentric relationship to other axial portions of said first shaft, a first roller carried on said first axial portion of said first shaft, said first roller including a bearing allowing free rotational movement about said first axial portion of said first shaft.

2. The apparatus as described in claim 1 wherein:

said means for moving includes a second shaft having a first axial portion that is disposed in eccentric relationship to other axial portions of the second shaft and a second roller carried on the first axial portion of the second shaft, said second roller including a bearing allowing free rotational movement about the first axial portion of the second shaft.

3. The apparatus as described in claim 2 wherein:

said means for moving includes a third shaft having a first axial portion that is disposed in eccentric relationship to other axial portions of the third shaft and a third roller carried on the first axial portion of the third shaft, said third roller including a bearing allowing free rotational movement about the first axial portion of the third shaft.

4. The apparatus as described in claim 3 wherein:

said means for moving includes a fourth shaft having a first axial portion that is disposed in eccentric relationship to other axial portions of the fourth shaft and a fourth roller carried on the first axial portion of the fourth shaft, said fourth roller including a bearing allowing free rotational movement about the first axial portion of the fourth shaft.

5. The apparatus as described in claim 4 further including:

means for rotating said first and second shafts to urge said rollers against said gate and move said gate to compress said seal.

6. The apparatus as described in claim 5 wherein:

said means for rotating includes at least a first pneumatic cylinder.

7. The apparatus as described in claim 6 wherein:

said means for rotating includes a mechanical over-center linkage coupling said first pneumatic cylinder and said first and second shafts, said linkage having a locking position which said linkage will maintain after once been attained followed by a failure of the pneumatic supply to said first pneumatic cylinder.

8. The apparatus as described in claim 7 wherein:

said linkage includes an S-shaped arm.

9. The apparatus as described in claim 8 wherein:

said linkage includes a second arm fixed to said second shaft and said S-shaped arm is fixed to said first shaft.

10. The apparatus as described in claim 9 wherein:

said means for supporting including an intermediate roller disposed to engage said gate when said first, second, third and fourth rollers to are not engaged with said gate.

11. The apparatus as described in claim 1 wherein:

each bearing is a needle bearing.

12. The apparatus as described in claim 2 wherein:

each bearing is a needle bearing.

13. The apparatus as described in claim 3 wherein:

each bearing is a needle bearing.

14. The apparatus as described in claim 4 wherein:

each bearing is a needle bearing.

15. The apparatus as described in claim 5 wherein:

each bearing is a needle bearing.

16. The apparatus as described in claim 6 wherein:

each bearing is a needle bearing.

17. The apparatus as described in claim 7 wherein:

each bearing is a needle bearing.

18. The apparatus as described in claim 8 wherein:

each bearing is a needle bearing.

19. The apparatus as described in claim 9 wherein:

each bearing is a needle bearing.

20. The apparatus as described in claim 10 wherein:

each bearing is a needle bearing.

* * * * *